United States Patent [19]

Ohnuki

[11] Patent Number: 4,534,625
[45] Date of Patent: Aug. 13, 1985

[54] LENS TUBE FOR A HIGH VARI-FOCAL RATIO ZOOM LENS

[75] Inventor: Mitsuo Ohnuki, Sagamihara, Japan

[73] Assignee: Konishiroku Photo Industry Co., Ltd., Tokyo, Japan

[21] Appl. No.: 586,652

[22] Filed: Mar. 8, 1984

Related U.S. Application Data

[63] Continuation of Ser. No. 291,104, Aug. 7, 1981, abandoned.

Foreign Application Priority Data

Aug. 19, 1980 [JP] Japan .................. 55-112952
Aug. 19, 1980 [JP] Japan .................. 55-112953
Aug. 19, 1980 [JP] Japan .................. 55-112954

[51] Int. Cl.³ .................. G02B 7/10; G02B 15/14
[52] U.S. Cl. .................. 350/429
[58] Field of Search .................. 350/429, 430

[56] References Cited

U.S. PATENT DOCUMENTS

| | | |
|---|---|---|
| 3,185,029 | 5/1965 | Peck et al. .................. 350/429 |
| 3,330,615 | 7/1967 | Price .................. 350/429 |
| 3,752,565 | 8/1973 | Nagashima .................. 350/429 |
| 3,850,507 | 11/1974 | Uesugi .................. 350/429 |
| 4,286,845 | 9/1981 | Kamata .................. 350/430 |

Primary Examiner—Jon W. Henry
Attorney, Agent, or Firm—Jordan B. Bierman

[57] ABSTRACT

A lens tube for a high vari-focal ratio zoom lens is arranged to individually effect movement of a plurality of lens groups for the purpose of zooming, and to integrally move a plurality of lens groups of the purpose of focusing, and arranged so that a double helicoid mechanism for driving the first lens group is provided on a member constituting the lens tube, the lens tube being arranged so that operation of a zooming mechanism serves to move a focusing mechanism, for the purpose of compensation, by means of the helicoid mechanism mentioned above, and a cam mechanism provided on other members constituting the lens tube.

3 Claims, 7 Drawing Figures

LENS TUBE FOR A HIGH VARI-FOCAL RATIO ZOOM LENS

This application is a continuation of application Ser. No. 291,104, filed Aug. 7, 1981 now abandoned.

BACKGROUND OF THE INVENTION (a) Field of the Invention

The present invention relates to a lens tube structure of a multiple lens group type high vari-focal ratio zoom lens and, more particularly, to the focusing mechanism of a zoom lens arranged to carry out focusing by moving lens groups including at least one lens group other than a first lens group, which is arranged on the object side, said focusing mechanism being arranged to automatically compensate the movement amounts of said focusing lens groups which vary according to zooming.

(b) Description of the Prior Art

In known zoom lens systems, functions are alloted to the lens groups in such way that there is a first lens group for zooming and a second lens group for focusing and, generally, the first lens group arranged on the object side is used for focusing. For this purpose, the lens mount of the first lens group is arranged to be moved forward and backward in respect to the support tube thereof, by means of a helicoid, cam, etc., according to rotation of the focusing ring. In case of a two-group zooming lens system arranged to carry out focusing by varying an airspace between two lens groups, the first lens group is moved for both purposes of zooming and focusing. In this case, however, it is satisfactory if the lens moving mechanism is arranged so that the support tube is moved for the purpose of zooming and the lens mount for the first lens group is moved for the purpose of focusing. Therefore, the lens moving mechanism is substantially the same as the case of the aforementioned known zoom lens systems.

This is because the position of the conjugate point of the object in respect to the principal point on the image side of the first lens group may be regarded as approximately constant even when the lenses are moved for the purpose of zooming and, therefore, when the lens system is once focused, it is kept in the focused state even when zooming is carried out after focusing.

In case of known lens tubes for this kind of zoom lens systems, movement of lens groups for the purpose of zooming is generally effected by means of a single helicoid or combination of a cam and slide tube. As, however, the varifocal ratio becomes larger, the cam mechanism becomes complicated and, at the same time, problems are caused in reliability.

Some of recently disclosed zoom lenses are arranged so that the first lens group is moved by using a double helicoid mechanism in its case where the movement amount of the first lens group is large.

When, however, only a particular lens group is used for focusing as described above, the movement amount of the lens group becomes large when it is attempted to focus the lens system on an object at a short distance. Moreover, in case of a zoom lens which contains a wide angle in its vari-focal range, the diameter of the first lens group should be made large in order to prevent decrease in the quantity of marginal rays, and this makes it difficult to arrange the lens system compactly and to improve simplicity of operation.

On the other hand, when the functions of respective lens groups are not fixed as in case of known zoom lenses but it is so arranged that the lens groups having the functions for zooming are utilized also for focusing, the number of lens groups which can be utilized for zooming increases even when the lens configuration of the zoom lens system is not changed and, consequently, it is possible to increase the zoom ratio. Moreover, the number of lens groups which can be utilized for focusing also increases and, therefore, it is possible to focus the lens system up to a short object distance without making the movement amounts of lens groups large. A new type of zoom lens system arranged as described above is also developed.

However, in case of the above-mentioned type of zoom lens system, optical conditions such as the total focal length of focusing lens system, positions of conjugate points, etc. changed according to zooming. Therefore, even when the zoom lens system is once focused, it cannot be maintained in the focused state unless lens groups are further moved for focusing when the lens system is zoomed. Moreover as the movement amounts at that time vary according to changes of two variables, i.e., the distance to the object and focal length of the zoom lens system, a two-dimensional cam is generally required and it is practically impossible to arrange such lens moving mechanism into a small-sized portable zoom lens.

On the other hand, it is now made clear that zooming by keeping the lens system focused on the same object is attained by moving the focusing lens groups using different portions of only one curved cam, utilizing the fact that the curve of lens movement amounts required for zooming becomes a curve resembling a logarithmic curve when the object distance is regarded as constant.

SUMMARY OF THE INVENTION

It is, therefore, a primary object of the present invention to provide a lens tube comprising a new focusing means to be used with a special high vari-focal ratio zoom lens system as described above, said focusing means being arranged so that cam grooves to be used as lens-group movement restricting members are provided to mutually different members which move relatively to one another and lens group positions are controlled by means of intersecting positions of those cam grooves. The mutually intersecting cam grooves are arranged to be moved according to mutually different factors, i.e., zooming and focusing, in such manner that respective lens groups are individually moved in case of zooming and focusing lens groups are integrally moved in case of focusing, the focusing means thus being enabled to move the same lens groups in quite different patterns of movements according to the purpose of movement.

Besides, the focusing means according to the present invention comprises a member to be moved by the focusing operation and a compensating member to be moved by the zooming operation, and is so arranged that the positions of the respective lens groups are decided by both movement restricting members. Therefore, even in case of such a zoom lens system that the movement amounts of lens groups for focusing change according to zooming, the focusing means according to the present invention enables one to use the same distance graduations in common to the respective focal lengths, and to keep the zoom lens system always in the focused state, when the lens system is once focused on an object, by automatically compensating the movement amounts of lens groups even when the lens system is freely zoomed after focusing.

Furthermore, by considering the fact that the lens group movement amounts required for zooming become large and the number of lens groups to be moved for zooming also becomes large in the case of a high vari-focal ratio zoom lens system with the vari-focal ratio of four to five times, the focusing means according to the present invention is arranged so that the first lens group located on the object side is moved by a double helicoid mechanism and the other lens groups are moved by cams provided on the helicoid tube constituting the double helicoid mechanism, so that the zooming mechanism is simplified, the lens tube is made compact, and reliability is improved.

DETAILED DESCRIPTION OF THE PREFERRED EMBODIMENTS

Figure 1:
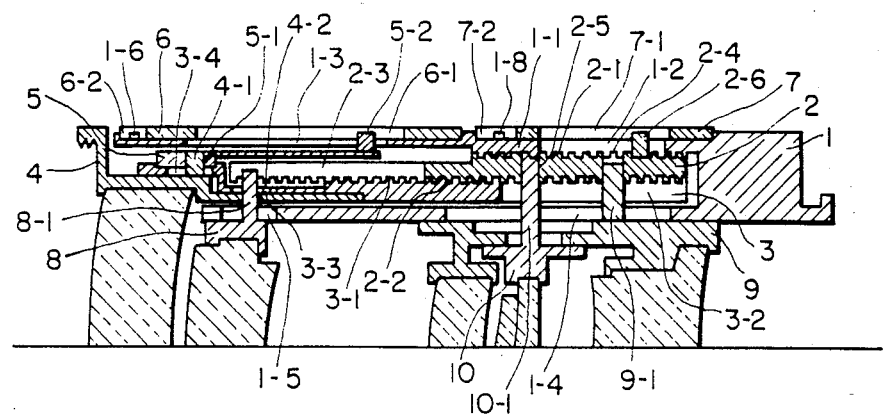
FIG. 1 shows a sectional view illustrating a longitudinal section of an embodiment of the lens tube having the lens group moving mechanism according to the present invention.

Now, the preferred embodiments of the lens tube according to the present invention are described below referring to the accompanying drawings. FIG. 1 shows a sectional view of a first embodiment of the lens tube according to the present invention. This embodiment shows a high vari-focal ratio zoom lens arranged so that five lens groups are individually moved for the purpose of zooming and, to simplify the explanation on focusing, the first and second lens groups are used as the focusing lens groups. Therefore, in this embodiment, the first lens group and second lens group carry out different movements at the time of zooming and integrally move at the time of focusing.

A fixed tube 1 with a substantially C-shaped section has an outer tube and inner tube. The outer tube has a helicoid screw portion 1-1 and concave portions 1-2 and 1-3 on the inner surface thereof while the inner tube has a guide groove 1-4 formed in the direction of optical axis and concave portion 1-5. Stop pins 1-6 and 1-8 for a zooming ring and focusing ring are provided at suitable positions on the outer tube. One end of the concave portion 1-3 is formed as a limiting member 1-7 on the short-distance side in focusing as explained later.

A double helicoid comprising a female helicoid 2 and male helicoid 3 is arranged in the space between the inner and outer tubes of the fixed tube 1. The female helicoid 2 has a helicoid screw portion 2-1, which is formed on the outer surface thereof and which engages with said helicoid screw 1-1, and a screw portion 2-2 formed on the inner surface thereof. Besides, the female helicoid 2 has, at the end portion thereof, a guide groove 2-3 which is formed in the direction of optical axis and which engages with a pin 8-1 of a lens mount 8 for the second lens group. The female helicoid 2 also has a cam groove 2-4 which engages with a pin 9-1 of a lens mount 9 for the third and fifth lens groups, and a cam groove 2-5 which engages with a pin 10-1 of a lens mount 10 for the fourth lens group. On the outer surface of the female helicoid 2, a pin 2-6 is fixed so as to engage with the zooming ring by passing through the concave portion 1-2 as described later.

The male helicoid 3 has, on the outer surface thereof, a helicoid screw portion 3-1 engaging with the helicoid screw 2-2, a cut-out portion 3-2 for the pins 9-1 and 10-1, a concave portion 3-3 for the pin 8-1, and a guide groove 3-1 which is formed in the direction of optical axis and which engages with a focusing pin 4-1 described later. Besides, the male helicoid 3 is prohibited from rotating in respect to the fixed tube by means of a key, which is provided at a position not shown in the figure, and is arranged to be movable only in the forward and backward direction.

A focusing slide tube 4, which is slidably fitted to the inner surface of the male helicoid 3, carries the first lens group fixed thereto, has a cam 4-2 engaging with the pin 8-1, and carries a pin 4-1 which is fixed to the outer surface of the focusing slide tube 4 and engages with both of the guide groove 3-4 of the male helicoid 3 and focusing cam 5-1 described later. The focusing slide tube 3 is arranged to be slidable only in the forward and backward direction by means of the guide groove 3-4.

A focusing control ring 5 is carried by the male helicoid 3 so as to be rotatable only and has a focusing cam 5-1 which engages with the pin 4-1 of the focusing slide tube 4. The focusing cam 5-1 directly controls the movement amounts of lens groups for focusing. Besides, a pin 5-2 is fixed to the outer surface of the focusing control ring 5.

A focusing ring 6 is carried by the fixed tube 1 so as to be rotatable only and is provided with a focus compensation cam 6-1 and a shoulder portion 6-2 with which the pin 1-6 comes into contact when the zoom lens is focused on the infinite distance as described later. The focus compensation cam 6-1 engages with the above-mentioned pin 5-2 and compensates the movement amounts of lens groups at the time of zooming by rotating the focusing control ring 5 and thereby slightly rotating the focusing cam 5-1. The shoulder portion 6-2 is to stop further rotation of the focusing ring 6 when the focusing ring 6 comes to the position where the zoom lens is focused on the infinite distance.

A zooming ring 7 is carried by the fixed tube 1 so as to be rotatable only, has a guide groove 7-1 formed in the direction of optical axis, and engages with the aforementioned pin 2-6 fixed to the female helicoid 2. Besides, the rotational angle of the zooming ring 7 is limited by engagement between a cut portion 7-2 and stop pin 1-8.

Figure 2:
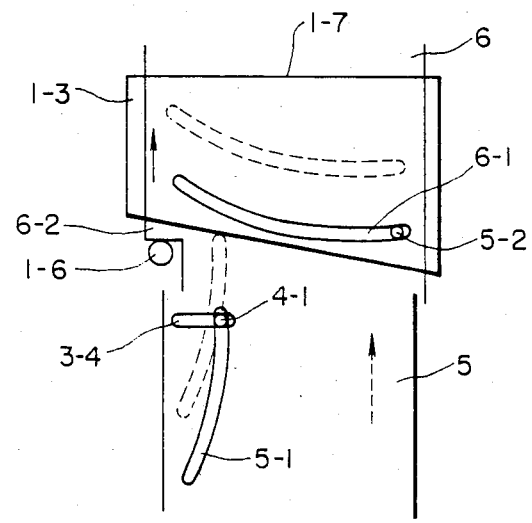
FIGS. 2, 3, 4 and 5 respectively show explanatory figures illustrating the operations of respective cams.
Figure 3:
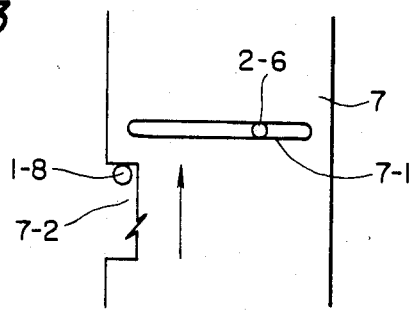
Figure 4:
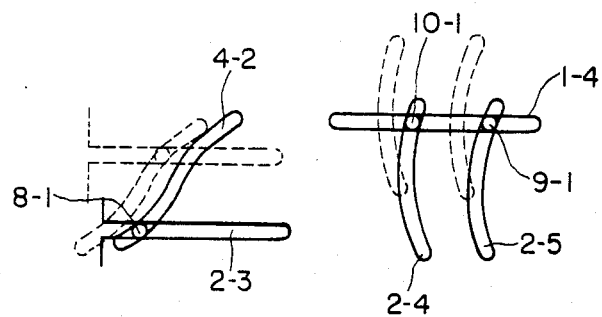

FIGS. 2 through 4 respectively show developed views illustrating the states of engagement between the above-mentioned respective pins and movement restricting members such as cams by excluding the concave portions.

In the zoom lens having the lens tube described in the above, focusing and zooming are carried out as described below.

FIG. 2 shows the position in which the shoulder portion 6-2 of the focusing ring 6 is in contact with the stop pin 1-6 and the zoom lens is focused on an infinite distance. When the focusing ring 6 is rotated in the direction of the full line arrow in order to focus the zoom lens on an object at a short distance, the focus compensation cam slot 6-1, which is seen through the concave portion 1-3, rotates to the position shown by the broken line together with the pin 5-2 and, at the same time, the focusing control ring 5 and focusing cam 5-1 also move as indicated by broken lines. As a result, the focusing pin 4-1 advances along the guide groove 3-4, the focusing slide tube 4 also advances, and the first lens group is thereby advanced. Besides, as the cam slot 4-2 advances, the pin 8-1 moves linearly in the guide groove 2-3, and the second lens group movable therewith is thereby advanced (FIG. 4). In other words, the first lens group and second lens group are integrally advanced by rotation of the focusing ring 6, and the zoom lens is thereby focused.

Zooming is carried out by rotating the zooming ring 7 the rotational angle of which is limited by engagement of the cut portion 7-2 with the stop pin 1-8 as shown in FIG. 3. When the zooming ring 7 is rotated, the guide groove 7-1 rotates together with the pin 2-6 and, therefore, the female helicoid 2 advances by rotating by means of the helicoid screws 1-1 and 2-1. At the same time, the cam grooves 2-4 and 2-5 also rotate by advancing. As a result, the third, fifth and fourth lens groups are moved as the pins 9-1 and 10-1 move in the guide groove 1-4 of the inner tube of the fixed tube 1. On the other hand, by rotation of the female helicoid 2, the male helicoid 3 which is not permitted to rotate is moved linearly together with the focusing slide tube 4 and focusing control ring 5 by means of the helicoid screws 2-2 and 3-1, and consequently, the first lens group is also advanced. Besides, as the pin 8-1 of the lens mount 8 for the second lens group is engaged with both of the cam groove 4-2 and guide groove 2-3 of the female helicoid 2, the pin 8-1 is rotated by the rotation of the female helicoid 2 and is moved by the resultant movement in an amount determined by the advancing movement of the cam 4-2 and in a retracting amount, which is determined by the inclination of the cam 4-2 and rotational angle of the guide groove 2-3.

Changes in positions of these cams according to rotation of the zooming ring 7 in the direction of the arrow are shown by broken lines in FIG. 4.

This embodiment is characterized in that, when the zoom lens is zoomed, the movement amounts of the lens groups for focusing vary even for the same object distance. This compensation of movement amounts is carried out as described below referring to FIG. 5.

Figure 5:
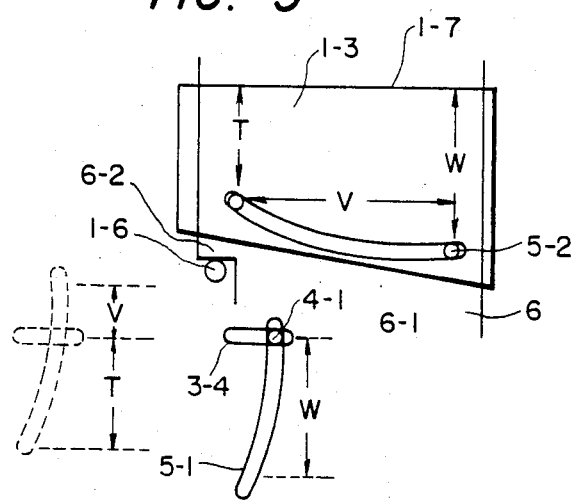

In the wide position shown by solid lines in FIG. 5, the rotational range of the focusing ring 6 for focusing is the range between the position where the stop pin 1-6 is in contact with the shoulder portion 6-2 for the infinite distance and the position where the pin 5-2 contacts the limiting member 1-7 on the short distance side, the limiting member 1-7 being an edge of the cut-out portion 1-3. Therefore, the range in which the pin 4-1 slides in engagement with the focusing cam 5-1 becomes the range shown by the reference symbol W. When the male helicoid 3 is advanced by zooming and the focusing control ring 5 is thereby advanced, the pin 5-2 advances by sliding in the compensating cam slot 6-1, the focusing control ring 5 is thereby rotated slightly, and the focusing cam 5-1 moves to the position shown by the broken line. Consequently, the sliding range of the pin 4-1 along the focusing cam slot 5-1 changes to the range shown by the reference symbol T in the figure. As a result of the above, the changes in the movement amounts lens groups focusing on the same object distance to be caused by zooming are compensated automatically and, therefore, it becomes possible to use the same distance gradations which represent the rotational amounts of the focusing ring 6. Besides, as the shortest object distance which permits focusing is decided by the position of the limiting member 1-7, it is possible to freely select the shortest distance for each focal length by selecting the shape of the limiting member 1-7.

With the zooming the lens system in the condition that it is focused on a particular object, the focusing ring 6 is not rotated after the lens system is once focused. When the zooming ring 7 is rotated in the above-mentioned state, respective lens groups are moved by the amounts determined by the movement restricting members such as the cam slots described above and, therefore, the total focal length of the lens system varies. As a result, the male helicoid 3 moves forward or backward. At the same time, the focusing control ring 5 also moves forward or backward, the pin 5-2 slides in the compensating cam 6-1 within the range V and the focusing control ring 5 is thereby rotated. This rotation of the focusing control ring 5 rotates the focusing cam slot 5-1 in the range V, the pin 4-1 is thereby moved forward or backward in the guide groove 3-4, and it is possible to thereby compensate the movement amounts of lens groups.

Figure 6:
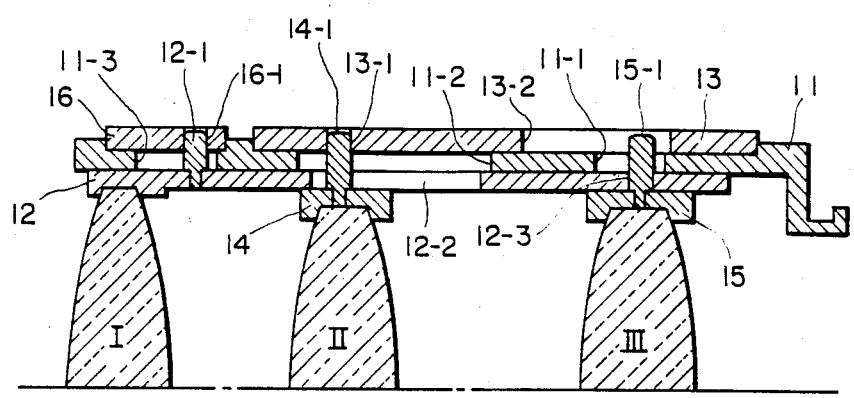
FIG. 6 shows a sectional view illustrating a longitudinal section of another embodiment of the present invention.
Figure 7:
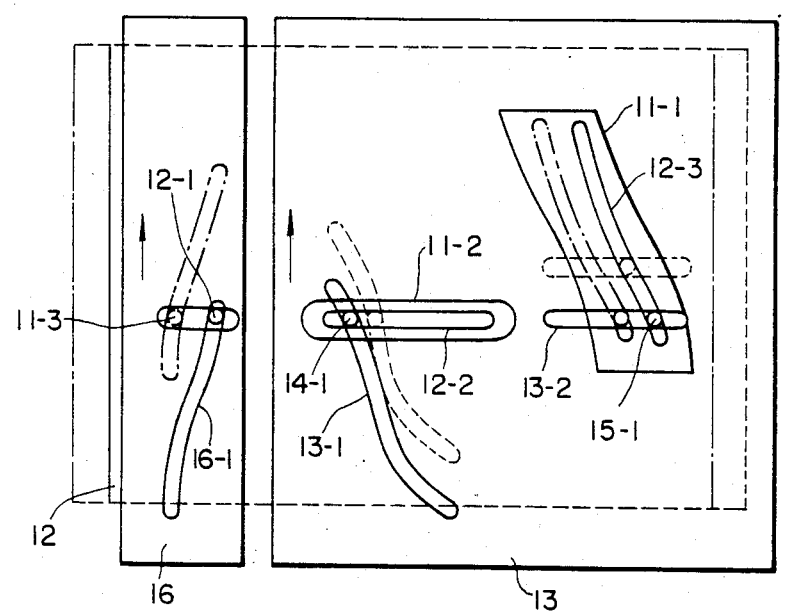
FIG. 7 shows an explanatory figure illustrating the operations of respective cams in the latter embodiment.

FIGS. 6 and 7 show a second embodiment of the present invention. The second embodiment illustrates a lens tube which is simplified compared with the first embodiment. To simplify the explanation, it is supposed that the zoom lens system comprises three lens groups and the moving mechanism of the zoom lens is arranged that the first lens group I is not moved, the second lens group II is moved toward the image side and the third lens group III is moved toward the object side at the time of zooming while the first lens group I and the third lens group III are moved forward at the time of focusing.

FIG. 6 shows a longitudinal sectional view illustrating the construction of the lens tube and FIG. 7 shows a developed view of the portion containing cam grooves in the lens tube in order to illustrate the relative positions and movements of cam grooves.

A fixed tube 11 has concave portions 11-1 and 11-2 and a cam slot 11-3, which linearly guides a pin 12-1 of a focusing slide tube 12. By this arrangement, the focusing slide tube 12 is prohibited from rotation but and is permitted to move forward and backward only. The cut-out portions 11-1 and 11-2 are made large so that they will not influence movement of the lens groups.

A zooming cam tube 13 is permitted to rotate only in respect to the fixed tube 11, and has a cam groove 13-1, which guides the sliding movement of a pin 14-1 of a movable lens mount 14 for the second lens group II, and a cam groove 13-2 which is formed in the direction of the optical axis and guides the sliding movement of a pin 15-1 of a movable lens mount 15 for the third lens group III.

A focusing control ring 16 is permitted to rotate only in respect to the fixed tube 11 and has a cam groove 16-1 which guides the pin 12-1 of the focusing slide tube 12.

The focusing slide tube 12 serves also as a movable lens mount for the first lens group I and has the pin 12-1, a cam slot 12-2 formed in the direction of optical axis and guiding the pin 14-1, and a cam slot 12-3 guiding the pin 15-1.

As the lens tube for a zoom lens is constructed as described in the above, zooming and focusing by this lens tube are carried out as described below. When the zooming cam tube 13 is rotated, for example, in the direction of arrowhead in FIG. 7, the pin 14-1 slides backwardly by rotation of the cam groove 13-1 to the position shown by the broken line, as the pin 14-1 is prohibited to rotate by means of the cam groove 12-2 and, consequently, the lens group II is also moved backward. At the same time the cam groove 13-2 also rotates to the position shown by the broken line. As, however, the slide tube 12 is prohibited from rotating, the pin 15-1 slides forward in the cam groove 13-2, being guided by the cam groove 12-3 and, consequently, the third lens group III is also moved forward. By these movements of the second and third lens groups, it is possible to materialize the afore-mentioned loci for zooming.

On the other hand, when the focusing ring 16 is rotated in the direction of the arrow, the pin 12-1 moves linearly, being guided by the cam slot 16-1, as the pin 12-1 is prohibited from rotating by means of the cam slot 11-3. As a result, the focusing slide tube 12 is moved forward as shown by the dash line and, consequently, the first lens group I is moved forward. At the same time, the cam groove 12-3 also moves forward as shown by the dash dot line and, therefore, the pin 15-1 is also moved linearly being guided by the cam slot 13-2. Consequently, the third lens group III is also moved linearly by the same length as the movement of the first lens group I.

It is a matter of course that the patterns of movements of respective lens groups, selection of lens groups for focusing, etc. adopted in the respective embodiments represent only examples for explaining the lens moving mechanism in the lens tube according to the present invention and, therefore, it is possible to freely alter the design within the scope of the present invention according to the type of zoom lens. It is also a matter of course that other types of movement restricting members may be used instead of cam grooves and, especially for the members for performing linear movements only, it is possible to utilize a linear-movement helicoid.

I claim:

1. A high vari-focal ratio zoom lens comprising a lens tube, a focusing ring and a zooming ring coaxially supported by said lens tube, a plurality of lens groups positioned within said tube, first control means mounted within said tube interconnecting said focusing ring with two lens groups for moving the same together for the purpose of focusing, and second control means mounted within said tube interconnecting said zooming ring with said two lens groups for moving the same in opposite directions for the purpose of zooming, in which said zoom lens incudes third, fourth and fifth lens groups, and means within said tube interconnecting said zooming ring with said five lens groups for performing at least four independent movements for the purpose of zooming.

2. A high vari-focal ratio zoom lens, comprising a lens tube, a plurality of lens groups positioned within said tube, focusing means and zooming means arranged on said tube for effecting a focusing operation and a zooming operation, respectively, first movement means within said tube including first cam means driven by the focusing means for moving a first set of said plurality of lens groups for a focusing operation to a focus state, second movement means within said tube including second cam means driven by the zooming means for moving a second set of said plurality of lens groups for a zooming operation, wherein at least one of said plurality of lens groups is common to said first and second sets and is positioned by an intersecting connection between said first cam means and said second cam means, and wherein said second set of lens groups are individually moved during said zooming operation, and said first set of lens groups are integrally moved during said focusing operation.

3. The zoom lens according to claim 2, wherein said first movement means include a non-linear cam wherein a working part thereof is moved to compensate for the movement of said at least one lens group at the time of the zooming operation in order to automatically maintain the focus state of said zoom lens.

* * * * *